United States Patent [19]
Whitechester

[11] 3,948,026
[45] Apr. 6, 1976

[54] LAWN MOWER

[76] Inventor: Thomas J. Whitechester, Rte. 8, Box 742-A, Yakima, Wash. 98902

[22] Filed: Oct. 31, 1974

[21] Appl. No.: 519,694

[52] U.S. Cl. .................................................. 56/255
[51] Int. Cl.² ........................................... A01D 35/26
[58] Field of Search ........... 56/16.1, 255, 249, 13.5, 56/16.7, 17.5; 172/21, 349, 350; 280/28.5; 305/15, 60

[56] References Cited
UNITED STATES PATENTS

| | | | |
|---|---|---|---|
| 2,188,644 | 1/1940 | Short | 172/349 |
| 2,730,856 | 1/1956 | Mekalainas | 56/249 |
| 2,881,846 | 4/1959 | Stromberg | 172/350 |
| 2,912,813 | 11/1959 | Ellsworth | 56/249 |
| 3,630,010 | 12/1971 | Rester | 56/13.5 |

*Primary Examiner*—Hugh R. Chamblee
*Assistant Examiner*—J. N. Eskovitz
*Attorney, Agent, or Firm*—D. Paul Weaver

[57] ABSTRACT

Spiked wheels or roller means are utilized on the lawn mower in lieu of the customary rubber tired support wheels to prevent mashing or flattening the grass prior to cutting. The usual unsightly tracks produced by conventional wheels are eliminated. The spiked wheels or roller means penetrate the standing grass with negligible disturbance while furnishing adequate support for the mower. The spiked wheels or rollers may be mounted directly ahead of the cutter blades to allow "zero clearance trimming" when mowing edges of the lawn.

4 Claims, 9 Drawing Figures

LAWN MOWER

The objective of the invention is to eliminate the unsightly tracks of uncut grass in lawns caused by the wheels of lawn mowers flattening the grass prior to the passage of the cutting blade, with the result that the flattened areas remain uncut.

In the accomplishment of this objective, the customary wheels of the mower are replaced by spiked supporting wheels or rollers which adequately support the mower and do not seriously lessen its mobility while substantially eliminating the grass flattening or mashing effect produced by the usual rubber tired wheels.

The spiked front supporting means may be in the form of paired spiked rollers or wheels or a series of such rollers completely spanning the front of the mower. The spikes may be in various forms or shapes and are preferably staggered circumferentially of the spiked rotor axis. Various configurations are contemplated. The structure is entirely compatible with the customary height adjusting means found on most power lawn mowers to regulate the height of the cut.

Other features and advantages of the invention will become apparent during the course of the following description.

BRIEF DESCRIPTION OF DRAWING FIGURES

DETAILED DESCRIPTION

Figure 1:
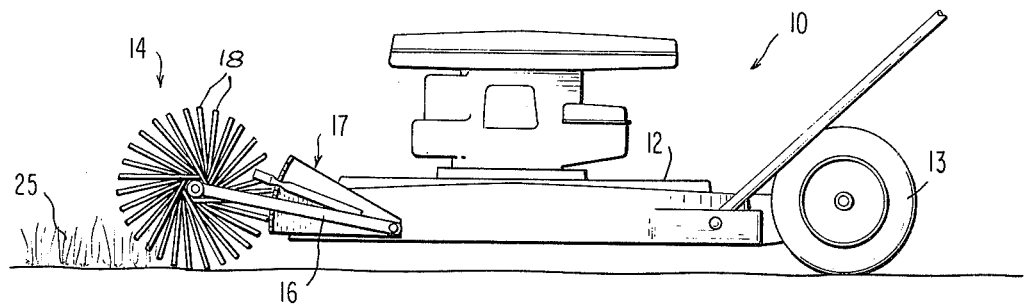
FIG. 1 is a side elevation of a lawn mower equipped with the spiked front supportive means embodying the invention in accordance with one form thereof.

Referring to the drawings in detail, wherein like numerals designate like parts, the numeral 10 designates a conventional power mower of the rotary blade type and having a vertical axis horizontal cutter blade 11 of any customary construction. The mower housing 12 is supported at its rear by conventional wheels 13 which encounter the grass after it is cut and consequently have no significant flattening or tracking effect on the mowed lawn.

Figure 2:
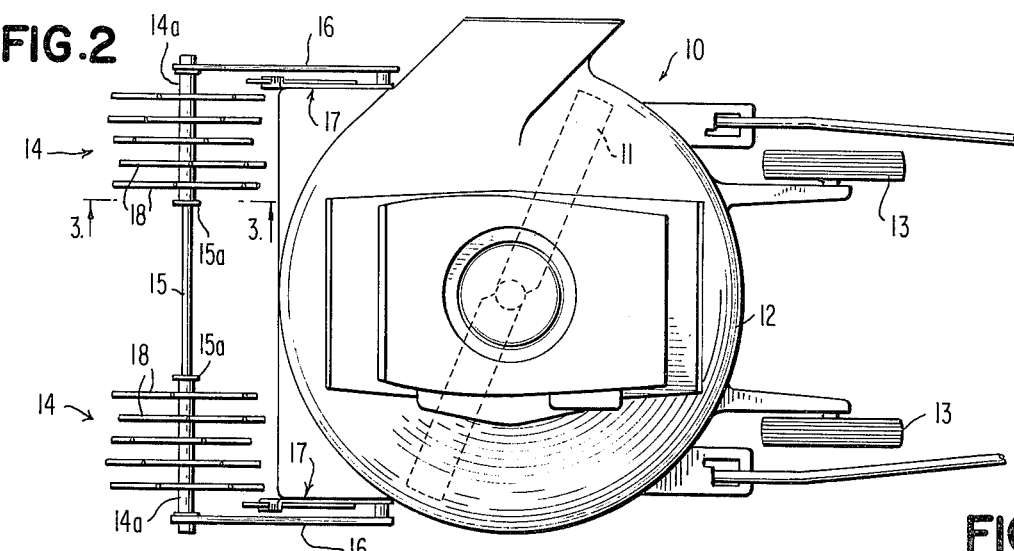
FIG. 2 is a plan view of the same.

In lieu of similar conventional front wheels for the mower 10, the invention according to one preferred embodiment provides a pair of spaced spiked roller supporting units 14 mounted on a transverse shaft or axle 15, in turn carried by longitudinal support arms 16 suitably attached to the mower housing. Each spiked unit 14 comprises a sleeve 14a rotatably mounted on the axle 15 and held against axial displacement by a fixed collar 15a on the axle. Each unit 14 further comprises a multiplicity of generally radial equal length spikes or tines 18 securely welded to the sleeve 14a in circumferentially equally spaced relation. The spikes of each unit 14 are preferably arranged in four or five distinct axially spaced groups, FIG. 2, with the spikes in each group staggered circumferentially from the spikes of adjacent groups. This staggered arrangement provides maximum ground contact, or ground-engaging continuity, with the spiked units 14, avoiding a rough or bumpy operation of the mower, which could prevail without the staggered and uniformly spaced relationship of the spikes, as depicted in FIG. 3.

The lawn mower 10 preferably possesses conventional blade height adjusting means 17 with which the invention is entirely compatible. It should be mentioned here that the invention is compatible with various types of mowers including rotary blade and flail types and mowers with reel type cutters, and both walking and rider type mowers.

Figure 4:
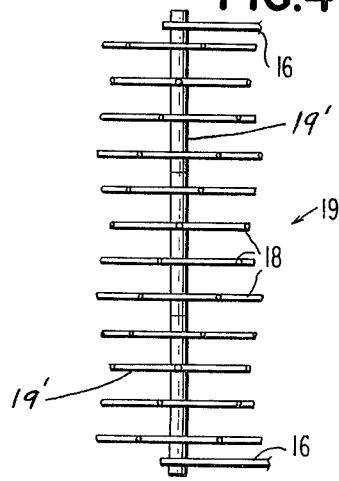
FIG. 4 is a fragmentary plan view showing a modification of the invention.

FIG. 4 illustrates a modification of the invention wherein a substantially continuous spiked roller support 19 at the front of the mower comprises three distinct spiked roller units 19', each constructed in the same manner as the described unit 14 including spikes welded to a central hub or sleeve, and the latter rotatably mounted on a cross axle held by the arms 16. Three such spiked units 19' are shown in FIG. 4.

Figure 3:
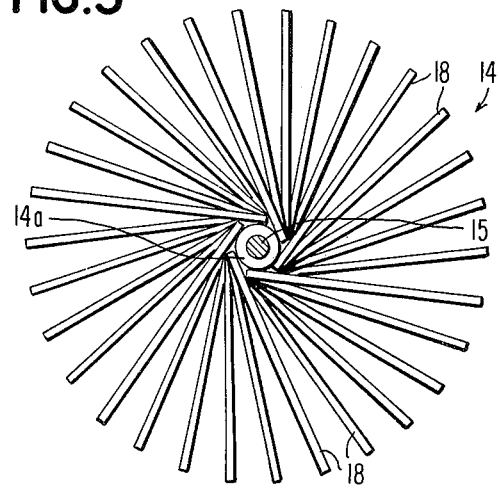
FIG. 3 is an enlarged fragmentary vertical section taken on line 3-3 of FIG. 2.
Figure 7:
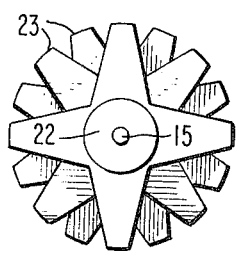
FIGS. 5, 6 and 7 are side elevational views depicting examples of spike forms which may be utilized in the invention.
Figure 5:
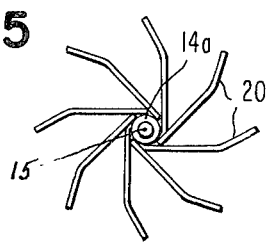
Figure 6:
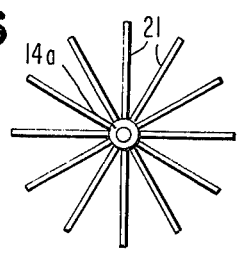

FIGS. 5, 6 and 7 illustrate that a number of different spike or roller forms may be employed in the invention instead of the arrangement of radiating spikes 18 depicted in FIGS. 1 through 4 where the inner end portions of the spikes have a somewhat tangential positioning with respect to the hub or sleeve 14a, see FIG. 3. In FIG. 5, for example, the modified spikes 20 or tines have generally radial inner portions and angularly arranged outer end portions facing in the direction of rotation of the supporting roller assembly.

FIG. 6 shows straight radial spikes 21 equidistantly spaced on the hub 14a to which they may be attached by welding and/or socketing in radial openings of the hub. The spikes 20 and 21 are also preferably arranged in several distinct groups on the hub 14a with the spikes in each group staggered circumferentially from those of adjacent groups for the advantage during operation previously mentioned.

FIG. 7 shows a further modification in which the front support roller is formed from plural metal discs having tapering blade-like fingers or spikes 23, the disc units having hub portions 22 engaged rotatably with shaft 15. Other spike forms may be employed within the scope of the invention.

Figure 8:
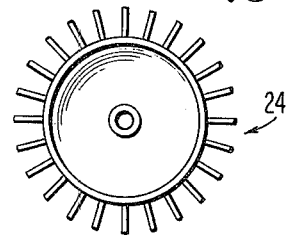
FIG. 8 is a side elevation of a spiked wheel for a rider type lawn mower or reel type walking mower.
Figure 9:
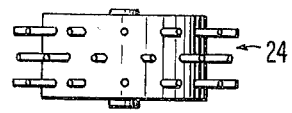
FIG. 9 is a plan view thereof.

FIGS. 8 and 9 show a spiked wheel 24 for rider-type mowers in which the wheel diameter is somewhat larger and its axial length somewhat shorter than the previous embodiments in the other drawing figures. As indicated in FIG. 9, the wheel spikes are preferably staggered for improved function and minimum bumpiness in operation.

In the operation of the invention, referring to FIG. 1, the spiked roller supporting means in any of the described forms roll over the ground and penetrate the standing grass 25 with minimum disturbance and without mashing or flattening the grass blades, and thus avoiding uncut tracks in the lawn as will occur with conventional mower wheels. At the same time, the spiked roller or wheel will lend adequate rolling support for the mower so that it will be sufficiently smooth in operation as compared to conventional structures. It may be noted in FIG. 2 that the swath cut in the grass by blade 11 is wider than the spacing of the back wheels 13 to eliminate tracking by the back wheels.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A lawn mower comprising a mower body including driven cutter means for mowing a swath of uniform width through grass as the mower is advanced, and spiked rotary supportive wheel substitute means mounted on the mower body at the front thereof in advance of the cutter means for rolling on the standing grass of a lawn substantially without flattening the grass and without appreciably penetrating the ground prior to cutting with said cutter means so that the grass in said swath is cleanly cut at a uniform height without uncut tracks of flattened grass.

2. The structure of claim 1, wherein said spiked rotary supportive wheel substitute means comprises plural axially spaced groups of generally radial spikes of uniform length with the spikes of adjacent groups staggered circumferentially so that the tips of the spikes will form a nearly continuous rolling contact with the ground.

3. The structure of claim 2, and said spiked supportive wheel substitute means formed in two laterally spaced units near opposite sides of said mower body.

4. The structure of claim 2, and said spiked supportive wheel substitute means formed as a continuous roller member spanning the front of said mower body.

* * * * *